(12) United States Patent
Kini et al.

(10) Patent No.: US 8,467,289 B2
(45) Date of Patent: Jun. 18, 2013

(54) OPTIMIZED FAST RE-ROUTE IN MPLS RING TOPOLOGIES

(75) Inventors: Sriganesh Kini, Fremont, CA (US); Marc Rapoport, Palo Alto, CA (US); Hua Autumn Liu, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 612 days.

(21) Appl. No.: 12/710,244

(22) Filed: Feb. 22, 2010

(65) Prior Publication Data
US 2011/0205885 A1    Aug. 25, 2011

(51) Int. Cl.
*G01R 31/08*   (2006.01)
(52) U.S. Cl.
USPC .............. 370/223; 370/400; 370/409
(58) Field of Classification Search
None
See application file for complete search history.

(56) References Cited

U.S. PATENT DOCUMENTS

| | | | |
|---|---|---|---|
| 7,944,924 B2 * | 5/2011 | Patel et al. | 370/392 |
| 2002/0141334 A1 | 10/2002 | Deboer et al. | |
| 2002/0172150 A1 * | 11/2002 | Kano | 370/216 |
| 2002/0191545 A1 * | 12/2002 | Pieda et al. | 370/238 |
| 2003/0112748 A1 | 6/2003 | Puppa et al. | |
| 2004/0193724 A1 * | 9/2004 | Dziong et al. | 709/232 |
| 2006/0198321 A1 | 9/2006 | Nadeau et al. | |
| 2007/0189265 A1 * | 8/2007 | Li | 370/351 |
| 2009/0103442 A1 * | 4/2009 | Douville | 370/248 |
| 2009/0161560 A1 | 6/2009 | He et al. | |
| 2012/0207017 A1 * | 8/2012 | Ceccarelli et al. | 370/227 |

OTHER PUBLICATIONS

Non-Final Office Action, U.S. Appl. No. 12/710,213, dated Jun. 7, 2012, 8 pages.
M. Bocci, et al.; MPLS Generic Associated Channel; Standards Track; Network Working Group; Jun. 2009; 19 pages.
Kini, et al.; A Fast LSP-alert Mechanism; Network Working Group; Aug. 2010; 7 pages.
PCT International Search Report and Written Opinion; International Appl No. PCT/B2011/050351 filed Jan. 27, 2011.
Pan, et al; Fast Reroute Extensions to RSVP-TE for LSP Tunnels; Network Working Group; 38 pages.
Kini, et al.: "Efficient Fast Re-route (FRR) using Facility backup in ring topology; draft-kini-mpls-ring-frr-facility-backup-00.txt", Internet Engineering Task Force, IETF; Standard Working Draft, Internet Society (ISOC) 4; Feb. 22, 2010, 12 pages.

* cited by examiner

*Primary Examiner* — Kevin C Harper
(74) *Attorney, Agent, or Firm* — Blakely, Sokoloff, Taylor & Zafman LLP

(57) ABSTRACT

A method performed on a network element employing Multi-protocol Label Switching (MPLS) to optimize bandwidth in a ring topology network including a back-up Label Switch Path (LSP) for a protected LSP by re-routing traffic onto the back-up LSP to avoid shared links between the protected LSP and back-up LSP, including receiving a first labeled packet from another label switch router (LSR) in the back-up LSP, the first labeled packet indicating protection switch of data from the protected LSP to the back-up LSP, determining whether a shared link in the ring topology network exists between the protected LSP and the back-up LSP, rerouting traffic for the protected LSP onto an optimized back-up LSP to remove the shared link, receiving a second labeled packet indicating that a protection switch of data, and restoring routing of the traffic onto the protected LSP in response to receiving the second labeled packet.

18 Claims, 7 Drawing Sheets

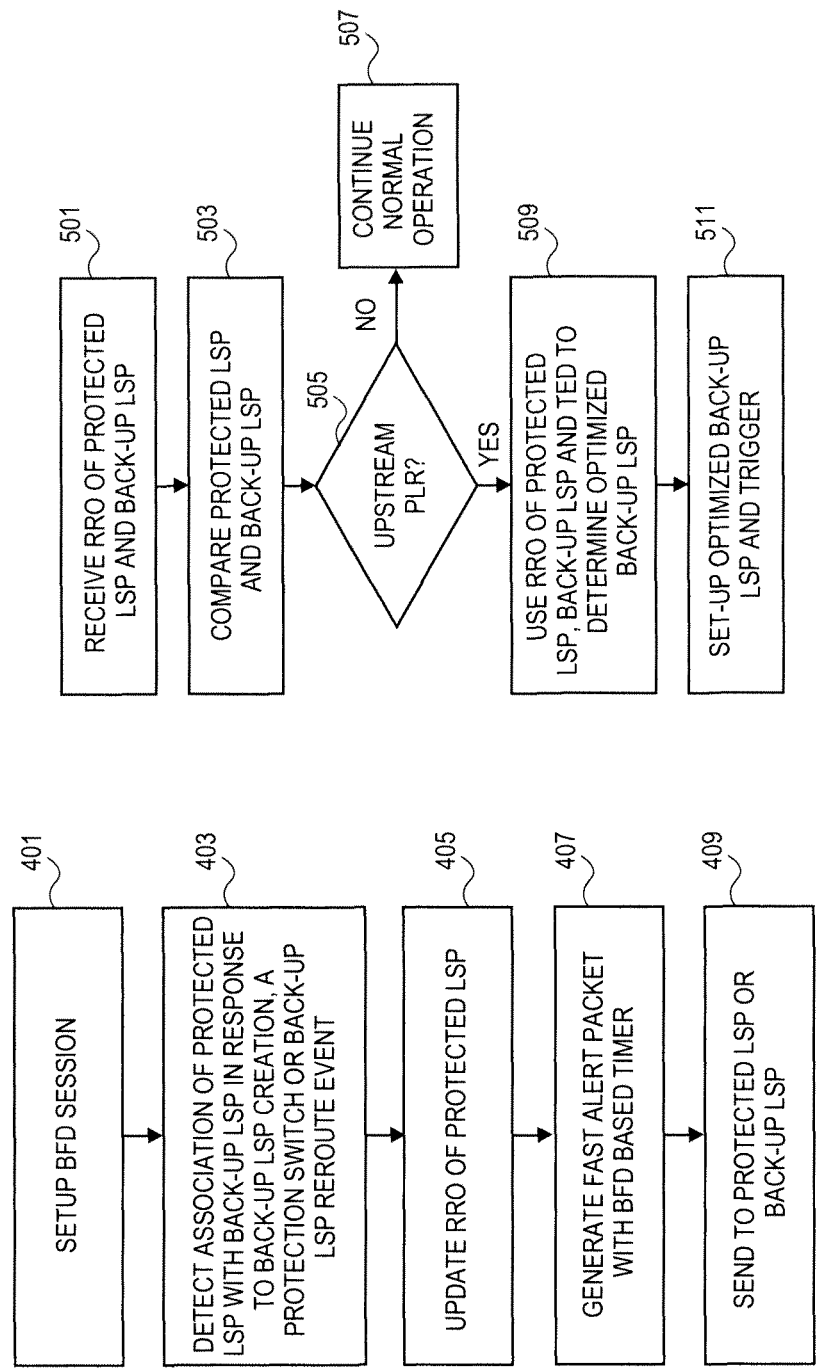

OPTIMIZED FAST RE-ROUTE IN MPLS RING TOPOLOGIES

CROSS-REFERENCE TO RELATED APPLICATION

The application is related to co-pending patent application Ser. No. 12/710,213 filed on Feb. 22, 2010, having the title "Fast LSP Alert Mechanism."

FIELD OF THE INVENTION

Embodiments of the present invention relate to a system for managing multi-protocol label switching over a network. Specifically, the embodiments of the invention relate to a method and system for optimizing the routing of traffic onto back-up label switch paths in a ring topology.

BACKGROUND

Multi-protocol label switching (MPLS) is a technology utilized to manage traffic over a network. MPLS uses labels that are assigned to a stream of traffic to route the traffic across the network. Each node of the network supports MPLS by reviewing incoming traffic received over the network and forwarding that traffic based on its label.

MPLS networks with traffic engineering capabilities can optimize traffic engineering resource allocation for customized traffic services. In MPLS networks with traffic engineering, the protected label switch path (LSP) is set up for each customized traffic service. A back-up LSP for each customized traffic service is utilized in case of a failure of the protected LSP and must be configured manually. Each of the links in the back-up LSP is manually selected to construct a back-up LSP with a goal of creating a disjointed path that can be relied upon when the protected LSP is in a state of failure.

MPLS and the use of protected LSPs and back-up LSPs can be employed in any network topology. In a ring topology, a protected LSP and back-up LSP are more likely to have a less disjointed path resulting in a greater number of shared links. A failure in a ring topology is likely to create a scenario where traffic being routed from a protected LSP onto a back-up LSP after the failure of a link in the protected LSP passes over links near a point of local repair twice.

The traffic traverses the ring on the protected LSP toward the point of local repair where it is routed onto the back-up LSP. The traffic on the back-up LSP traverses the ring in the opposite direction traversing links near the point of local repair for a second time. Similarly, traffic often passes over links near the merge point twice. As a result these links near the point of local repair and the merge point have their bandwidth requirements doubled in the event of a protection switch from the protected LSP to the back-up LSP. This can cause significant bandwidth issues, especially when this doubling of the bandwidth requirements nears or exceeds the bandwidth of the link.

SUMMARY

A method performed on a network element employing Multi-protocol Label Switching (MPLS) to optimize bandwidth in a ring topology network including a back-up Label Switch Path (LSP) for a protected LSP by re-routing traffic onto the back-up LSP to avoid shared links between the protected LSP and back-up LSP, the method comprising the steps of receiving a first labeled packet from another label switch router (LSR) in the protected LSP, the first labeled packet indicating protection switch of data from the protected LSP to the back-up LSP; determining whether a shared link in the ring topology network exists between the protected LSP and the back-up LSP, wherein the shared link is a link traversed by data traffic in the protected LSP in a first direction of the ring topology network and traversed by the data traffic again in a second direction on the back-up LSP; rerouting traffic for the protected LSP onto the back-up LSP to remove the shared link between the protected LSP and the back-up LSP; receiving a second labeled packet indicating protection switch of data from the back-up LSP to the protected LSP; and restoring routing of the traffic onto the protected LSP in response to receiving the second labeled packet.

A system for employing Multi-protocol Label Switching (MPLS) to optimize bandwidth in a ring topology network including a back-up Label Switch Path (LSP) for a protected LSP by re-routing traffic onto the back-up LSP to avoid shared links between the protected LSP and back-up LSP, the system comprising a first label switch router (LSR) in the protected LSP adapted to identify a failure in a link of the ring topology network and to initiate a first protection switch by sending a first fast alert packet on the protected LSP and a back-up LSP, the first LSR further adapted to identify a restoration of the link and to initiate a second protection switch by sending a second fast alert packet on the protected LSP and back-up LSP; and a second LSR in communication with the first LSR over the ring topology network, the second LSR adapted to receive a first fast alert packet, determine whether an shared link exists between the protected LSP and the back-up LSP, wherein the shared link is a link traversed by data traffic in the protected LSP in a first direction of the ring topology network and traversed by the data traffic again in a second direction on the back-up LSP, reroute traffic for the protected LSP onto the back-up LSP to remove the shared link, receive a second fast alert packet that indicates that the second protection switch of data from the back-up LSP to the protected LSP, and restore routing of the traffic onto the protected LSP in response to receiving the second fast alert packet.

A network element for employing Multi-protocol Label Switching (MPLS) to optimize bandwidth in a ring topology network including a back-up Label Switch Path (LSP) for a protected LSP by re-routing traffic onto the back-up LSP to avoid shared links between the protected LSP and back-up LSP, the network element comprising an alert processing module adapted to receive a first labeled packet indicating that a first protection switch of data from the protected LSP to the back-up LSP and receive a second labeled packet indicating that a second protection switch of data from the back-up LSP to the protected LSP; and a optimized reroute module coupled to the alert processing module, the optimized reroute module adapted to determine whether an shared link exists in the back-up LSP, wherein the shared link is a link traversed by data traffic in the protected LSP in a first direction of the ring topology network and traversed by the data traffic again in a second direction on the back-up LSP, reroute traffic for the protected LSP onto the back-up LSP to remove the shared link in the back-up LSP, and restore routing of the traffic onto the protected LSP in response to receiving the second labeled packet.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one"

embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 4 is a diagram of one embodiment of a process for establishing a record route object for a protected LSP and a bypass LSP.

FIG. 5 is a diagram of one embodiment of a process for establishing an optimized bypass LSP.

DETAILED DESCRIPTION

Figure 1:
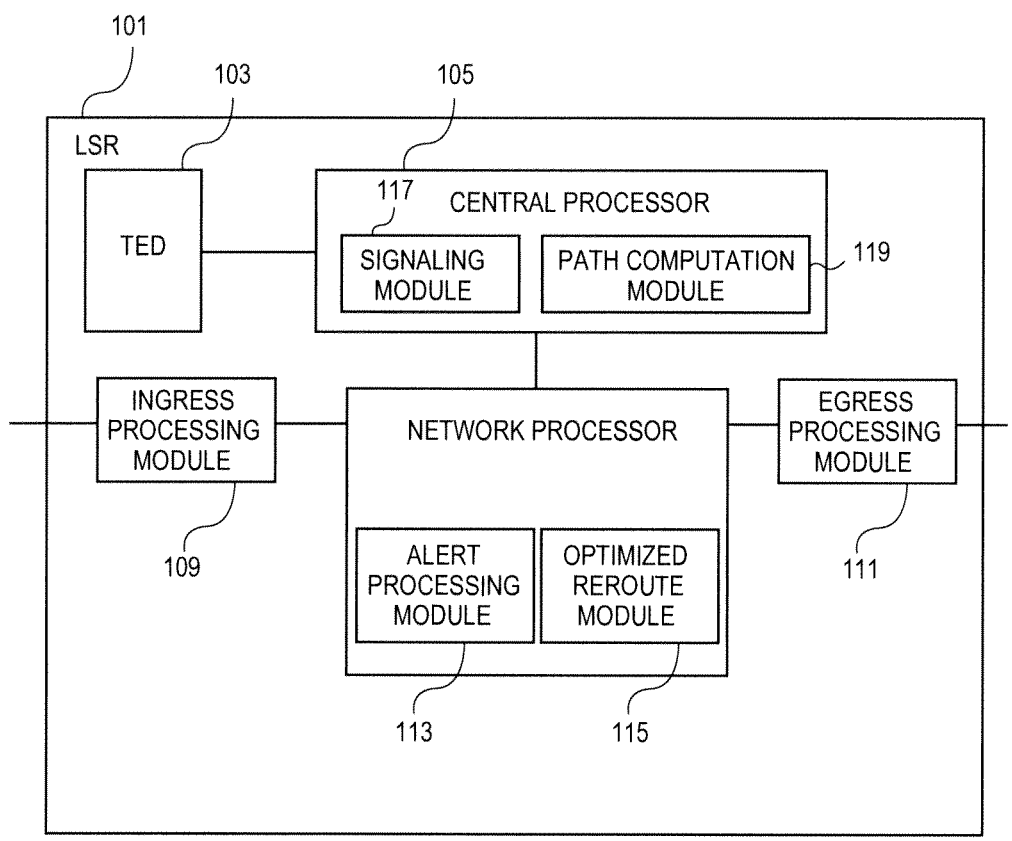
FIG. 1 is a diagram of one embodiment of a label switch router employing an optimized re-route process.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiment of FIG. 1. However, it should be understood that the operations of flow diagrams can be performed by embodiments of the invention other than those discussed with reference to FIG. 1, and the embodiments discussed with reference to FIG. 1 can perform operations different than those discussed with reference to the flow diagrams of FIGS. 2A and 3-7.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable or computer-readable media, such as machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage device and signals carrying the network traffic respectively represent one or more machine-readable or computer-readable storage media and machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and Video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

The embodiments of the present invention provide a system, network and method for avoiding the disadvantages of the prior art including: non-optimal back-up label switch paths (LSP), higher bandwidth requirements, and inefficient bandwidth utilization.

The embodiments of the invention overcome these disadvantages by detecting shared links between a back-up label switch path (LSP) and a protected LSP and optimizing the routing of traffic from the protected LSP to the associated back-up LSP by reducing the number of shared links traversed by the data traffic of the protected LSP and back-up LSP. The process identifies the label switch router that is shared between the back-up LSP and protected LSP and furthest upstream on the protected LSP. The data traffic is rerouted from the protected LSP at the identified LSR instead of an LSR that is further downstream, thereby avoiding data traffic having to traverse the links between these two LSRs in both directions. This reduces the bandwidth requirements on many of the links, reduces the amount of dropped traffic and provides a more optimal back-up LSP route. This process is well suited for use in ring topologies, including a network with a ring sub-graph and any generic topology.

FIG. 1 is a diagram of one embodiment of a LSR employing the optimized re-route process. In one embodiment, the LSR 101 is a network element. The LSR 101 includes a central processor 105, a traffic engineering database 103, an ingress processing module 109, an egress processing module 111 and a network processor 107. The ingress processing module 109 and the egress processing module 111 handle the processing of data link layer, physical link layer packets. The ingress process module 109 and egress process module 111 can handle some or all of the processing of incoming and outgoing packets at the physical layer, data link layer and other layers of the open system interconnection (OSI) reference model below the multi-protocol label switching layer.

The central processor 105 includes a signaling module 117 and a path computation module 119. The signaling module 117 generates control packets that establish a label switch path. The path computation module 119 calculates the label switch path using the information from the traffic engineering database 103. The traffic engineering database 103 includes information about availability and characteristics of the nodes in the network.

The network processor 107 includes an alert processing module 113 and a optimized reroute module 115. The network processor 107 is responsible for implementing the processing of MPLS layer functionality. The alert processing module 113 identifies and processes alert messages received from other LSRs in the network. Alert messages can include fast alert messages that are forwarded across an LSP. The optimized reroute module 115 optimizes the routes of back-up LSPs such as bypass LSPs as defined by RFC 4090 and detour LSPs defined by RFC 4090.

Figure 2A:
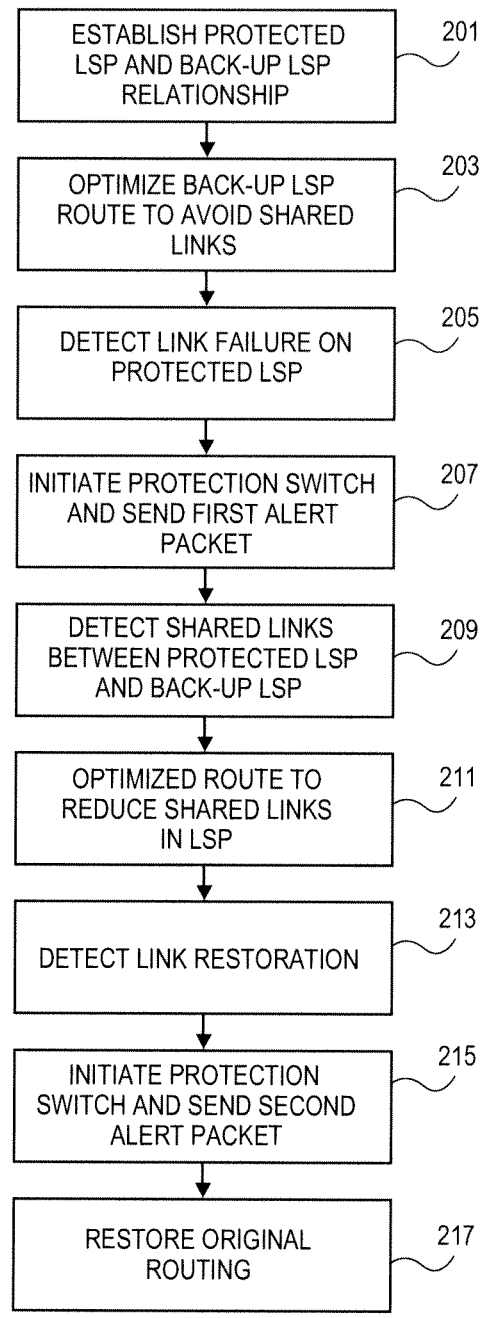
FIG. 2A is a flowchart of one embodiment of the optimized re-route process.

FIG. 2A is a flowchart of one embodiment of a process for optimizing the routing of data on a back-up LSP. In one embodiment, the process is initiated by establishing protected LSP and a back-up correlated LSP (Block 201). The back-up LSP may be analyzed and compared to the protected LSP to optimize the route to avoid shared links (Block 203). Shared links refer to those links that are shared between the protected LSP and the back-up LSP such that during a protection switch where traffic from the protected LSP is routed onto the back-up LSP traffic traverses a shared link twice. The traffic traverses the link while on the protected LSP before it is rerouted back across the same shared link while on the back-up LSP. In embodiments where the back-up LSP is a bypass LSP, the detection and optimization of the back-up LSP can take place prior to a protection switch. In embodiments where the back-up LSP is a detour LSP, the detection and optimization of the back-up LSP can take place at the time of the protection switch.

A link failure on a protected LSP is then detected (Block 205). This failure of a link between two LSRs in an LSP is detected by each of the LSRs on the link. Each LSR on the failed link can initiate a protection switch and sends a first alert packet to each of the LSRs and the protected LSP and back-up LSP (Block 207). The alert packet initiates the protection switch. In an embodiment where the back-up LSP is a detour LSP, then the shared links can be detected by an LSR that is upstream from the point of local repair (PLR) and the detour LSP is adjusted to avoid the shared links. The use of the back-up LSP involves an optimized reroute of data traffic to reduce the number of shared links (Block 211). The nature of the optimized reroute depends on whether a bypass LSP is utilized for the back-up LSP or a detour LSP is utilized for the back-up LSP. Reducing the number of shared links that data traffic traverses reduces the bandwidth requirements during a protection switch thereby improving the efficiency of bandwidth usage in the network. These techniques are well suited to improve bandwidth efficiency in topology networks and networks with a ring sub-graph and any generic topology.

The use of the back-up LSP to circumvent the failed link on the protected LSP continues until the failed link is restored (Block 213). The restoration of the failed link of is detected by the LSRs adjacent to the restored link. These LSRs initiate a protection switch back to the original protected LSP by sending a second alert packet (Block 215). The first and second alert packets can utilize a fast alert mechanism whereby a single alert packet is sent along the protected or back-up LSP and forwarded by each of the LSRs in the respective LSP as described in co-pending patent application Ser. No. 12/710,213 titled, "Fast LSP Alert Mechanism."

Figure 2B:
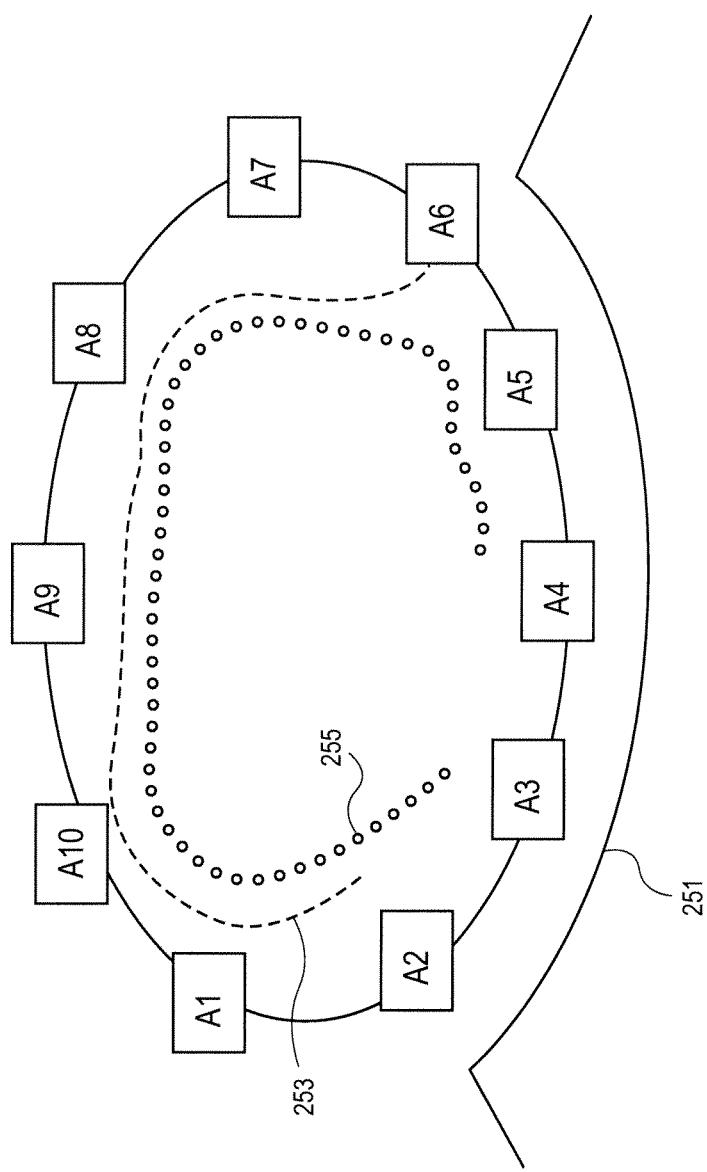
FIG. 2B is a diagram of one embodiment of a ring topology network employing an optimized re-route process.

FIG. 2B is a diagram of one example embodiment of an optimized rerouting of a back-up LSP. In the example embodiment, the network has a ringed topology with nodes A1-A10 forming the ring. One skilled in the art would understand the process is applicable to any network with a ring sub-graph and any generic topology. A protected LSP 251 is defined for traffic crossing a portion of the ring network. The protected LSP 251 starts at LSR A2 and ends at LSR A6. Data traffic associated with the protected LSP 251 traverses LSRs A2-A6. A back-up LSP 255 has been defined to provide protection for the link between LSRs A3 and A4. In the event that the A3, A4 link fails, data traffic from the protected LSP 251 is routed onto the back-up LSP 255.

The back-up LSP 255 can be a bypass LSP or a detour LSP. A bypass LSP as defined in RFC 4090 can be associated with any number of protected LSPs. A detour LSP as defined in RFC 4090 is associated with a single protected LSP. When this back-up LSP 255 is established, an optimized bypass LSP 253 can be identified at the LSR A2 by analysis of the record route object (RRO) for the back-up LSP and the protected LSP. The optimized back-up LSP can be defined and utilized in place of the back-up LSP to avoid the additional bandwidth requirements that would be needed for the link between A2 and A3.

When traffic is sent over the protected LSP 251 it traverses the protected LSP 251 until it reaches the LSR A3 where it is then is rerouted onto the back-up LSP 255 due to the failure of the A3, A4 link. This rerouting onto the back-up LSP 255 causes a doubling of the bandwidth required between the A2, A3 link due to the traffic traversing the A2, A3 link once on the protected LSP 251 and again on the back-up LSP 255. The optimized back-up 253 can be utilized in place of the back-up 255 to avoid this issue.

In the case where a detour LSP is utilized as the back-up LSP 255, the LSR A2 can recognize that the incoming traffic on protected LSP 251 is to be routed onto a detour LSP 255 at the PLR. To avoid the shared links between the detour LSP 255 and the protected LSP 251 the LSR A2 can the reroute data traffic onto the detour LSP 255 without forwarding it to A3, by instead forwarding it to A1 effectively altering the detour LSP to have path 253.

In either the bypass LSP implementation or the back-up LSP implementation, any number of LSRs in the network can implement the optimization process. If not all of the LSRs implemented optimization process, then the optimum LSR may not start the rerouting of the back-up LSP, but the nearest LSR to the optimal LSR that supports the optimization will be utilized The shared links near the merge point at the other end of the protected LSP and back-up LSP can also be optimized to avoid similar shared links. In the example, shared links between A4/A5 and A5/A6 can be avoided to further improve the bandwidth usage efficiency in the ring topology network.

Figure 3:
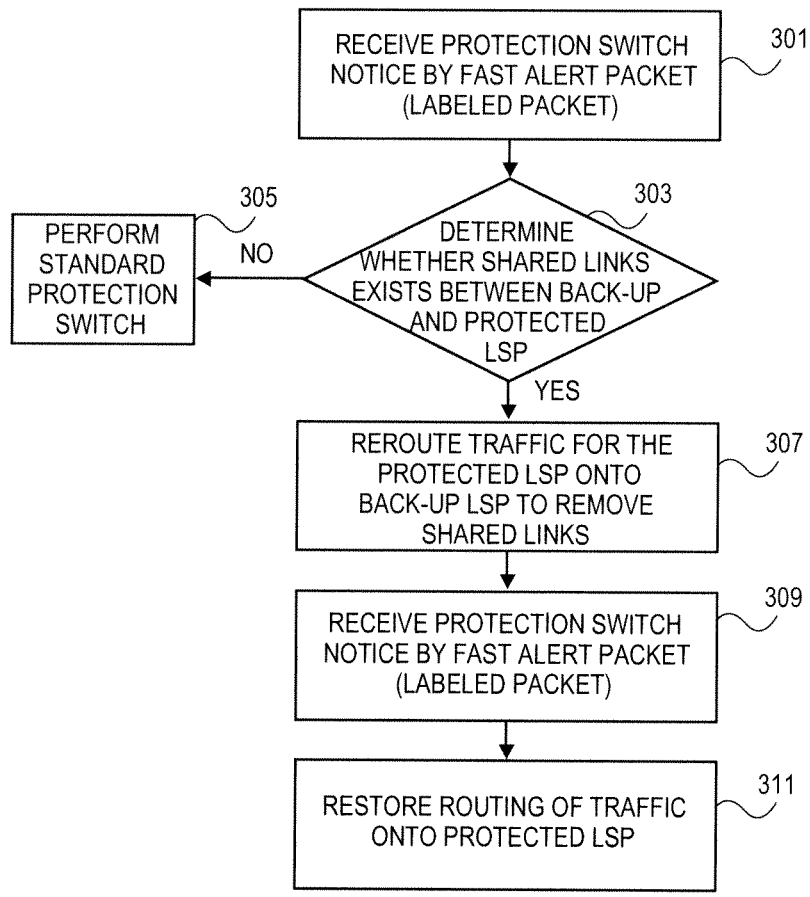
FIG. 3 is a flowchart of one embodiment of the optimized re-route processing of alert messages.

FIG. 3 is a flowchart of one embodiment of the process for handling a notification of a protection switch by an LSR. In one embodiment, the process is initiated by reception of a protection switch notice via a fast alert packet (Block 301). A fast alert packet is a labeled packet that utilizes a special indicator or identifier to enable special processing of the fast alert packet at receiving LSRs. The fast alert packet is copied and forwarded to the next LSR in the LSP, while the fast alert packet is being processed by the current LSR.

After the labeled packet is received, a check is made to determine whether shared links exists between the back-up LSP and the protected LSP (Block 303). This check depends on the implementation of the back-up LSP, specifically, whether the back-up LSP is a bypass LSP or a detour LSP. The detection of shared links and optimized rerouting for a detour LSP can be done in response to the receipt of the labeled packet. If the back-up LSP is a bypass LSP, then the check determines whether an optimized bypass LSP has already have been defined. If no shared links exist, then the standard protection switch process should be performed (Block 305). However, if shared links exist between the back-up LSP and protected LSP, then traffic is rerouted for the protected LSP to a back-up LSP, such that the rerouting removes shared links or reduces a number of shared links (Block 307).

The optimized back-up LSP with the reduced number of shared links is utilized until another protection switch notice is received via fast alert packet or other label packet (Block 309). In response to receiving the second fast alert packet, the routing of data traffic onto a protected LSP is restored (Block 311). The back-up LSP is not utilized for the data traffic unless a further protection switch occurs.

Figure 6:
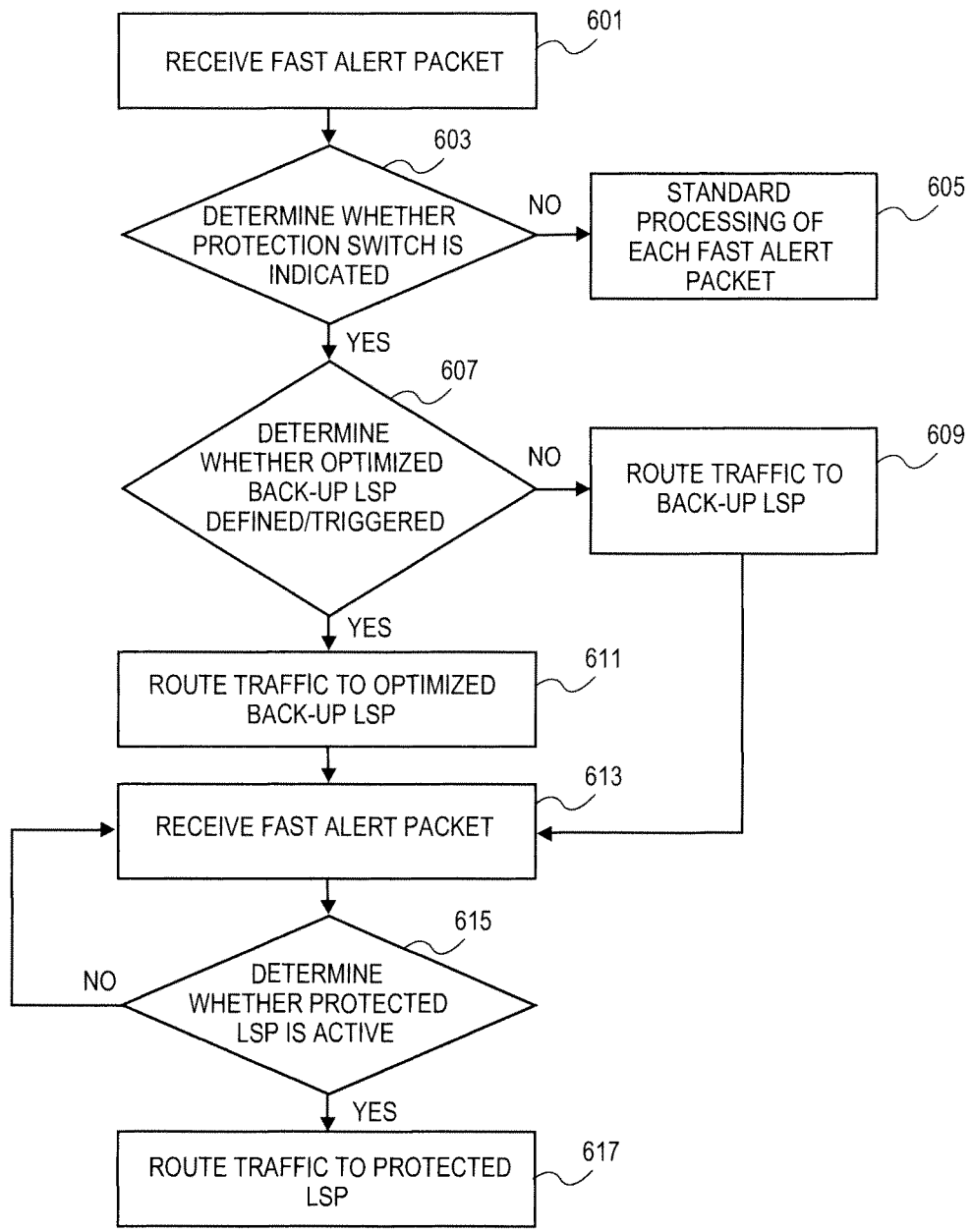
FIG. 6 is a flowchart of one embodiment of a process for a re-route on to a bypass LSP.

FIGS. 4-6 relate to an embodiment of the optimized back-up LSP process where the back-up LSP is implemented as a bypass LSP. FIG. 4 is a flowchart of one embodiment of a process for optimizing a bypass LSP. In one embodiment, the process can be initiated by setting up a bi-directional forwarding detection (BFD) session (Block 401). The BFD session functions to determine the availability and proper function of links in a network. This enables LSRs to determine when a link has failed, which can necessitate a protection switch. Establishing the BFD session is part of establishing a protected LSP. The protected LSP can be established by any automated or manual process.

The LSRs in a protected LSP can detect an association of the protected LSP with a bypass LSP in response to the creation of the bypass LSP, a protection switch or bypass LSP reroute event (Block 403). The association of the protected LSP with the bypass LSP is stored in the record route object (RRO) of the protected LSP and bypass LSP (Block 405). In one embodiment, RROs can be augmented to defining a new sub-object within the RRO. The new sub-object provides sufficient information to the nodes of the protected LSP to infer an association with the back-up LSP.

In response to detection of a failure of a link, the LSR creates a fast alert packet with a BFD based timer (Block 407). The fast alert packet is sent to each LSR in the protected LSP and/or the bypass LSP (Block 409). These fast alert packets initiate the protection switch to the bypass LSP.

FIG. 5 is a flowchart of one embodiment of a process of establishing an optimized bypass LSP. In one embodiment, the process is initiated by receiving an RRO of a protected LSP and bypass LSP at an LSR (Block 501). The LSR compares the routes of the protected LSP and the associated bypass LSP discerned from the RRO (Block 503). The LSR then determines whether the LSR is an upstream point of local repair for the associated protected LSP and that the LSR is shared by the protected LSP and the bypass LSP (Block 505). If the LSR is not an upstream PLR, then normal operation of the LSR can continue (Block 507). If the LSR is an upstream PLR, then the LSR uses the RRO of the protected LSP, the bypass LSP and the traffic engineering database to determine an alternate and optimized bypass LSP (Block 509). The LSR then sets up the optimized bypass LSP and a trigger (Block 511). The trigger can by any set of conditions that when met, cause the LSR to reroute traffic onto the optimized bypass LSP.

FIG. 6 is a flowchart of one embodiment of a process for processing fast alert packet by an LSR in the bypass LSP embodiment. In one embodiment, the process is employed by the LSR receiving a fast alert packet (Block 601). The fast alert packet is examined by the LSR to determine whether a protection switch is indicated (Block 603). The protection switch can be indicated by a 'traffic active' or 'traffic switch' message in the fast alert packet or through a similar system. If no protection switch is indicated by the fast alert packet, then the standard processing of the fast alert packet is undertaken by the LSR (Block 605).

If a protection switch is indicated by the fast alert packet, then a determination is made whether an optimized bypass LSP is defined or has been triggered (Block 607). The criteria for the trigger can be tested to determine whether the optimized bypass LSP is to be utilized. If no optimized bypass LSP has been defined or triggered, then the traffic is routed to the standard bypass LSP to effect the protections switch (Block 609).

If, however, the optimized bypass LSP has been defined and/or triggered then the traffic is routed to the optimized bypass LSP (Block 611). Data traffic is routed onto the bypass LSP or optimized bypass LSP until another fast alert packet is received (Block 613). The new fast alert packet is examined to determine whether a protected LSP is active again (Block 615). The new fast alert packet can indicate that a protections switch back to the protected LSP is to be performed with a 'traffic inactive' or 'traffic switch' message. If the protected LSP is not active then the process continues to wait until for another fast alert packet (Block 613). During this time data traffic continues to be routed onto the bypass LSP or optimized bypass LSP. However, if the protected LSP is active then the traffic is routed back on to the protected LSP (Block 617).

Figure 7:
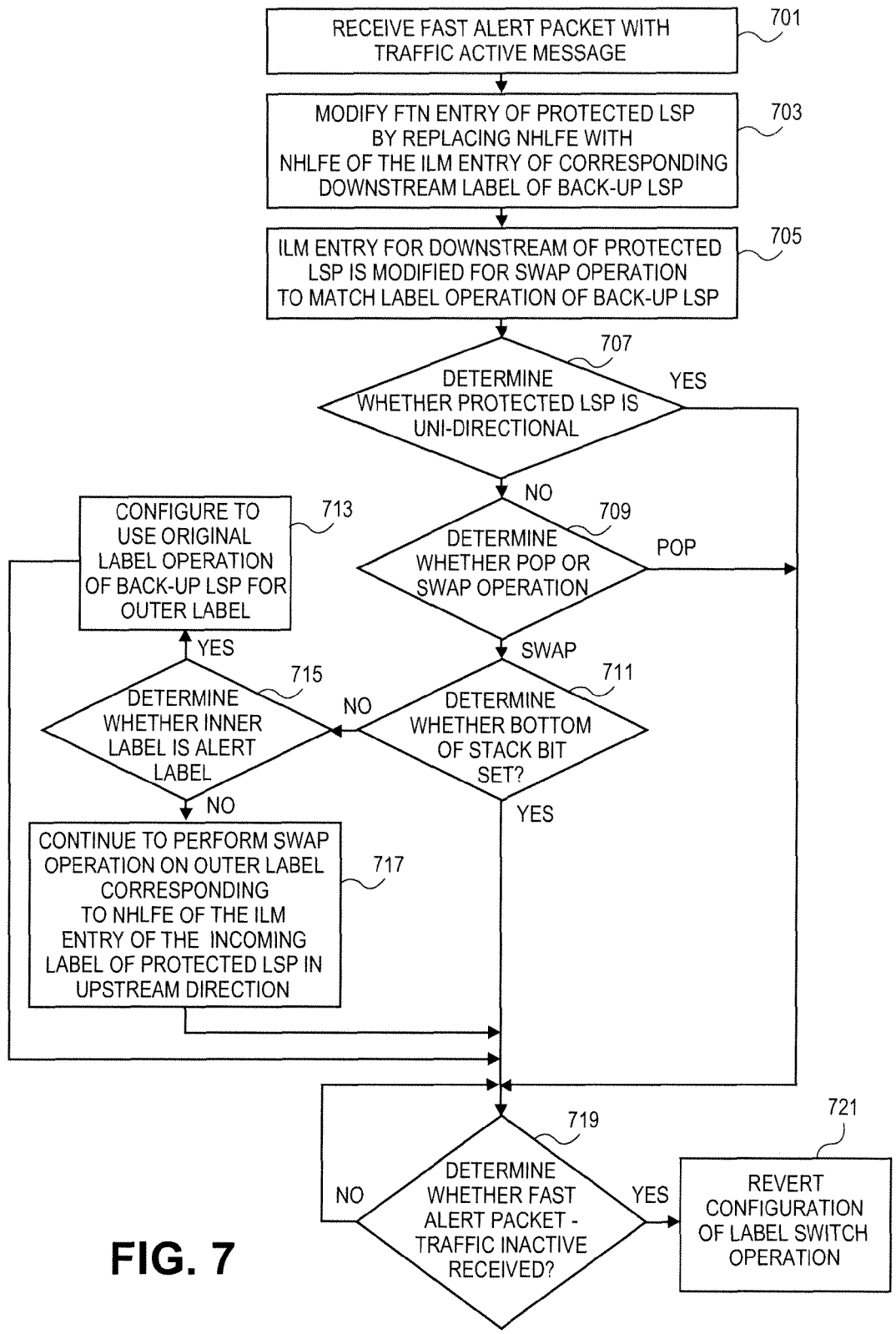
FIG. 7 is a diagram of one embodiment of a process for a re-route on to a detour LSP.

FIG. 7 is a flowchart of one embodiment of the process of handling a fast alert packet for a detour LSP implementation. In one embodiment, this process is initiated by the LSR receiving a fast alert packet with a 'traffic active' or 'traffic switch' message (Block 607). In response to receiving a fast alert packet with a 'traffic active' or 'traffic switch' message, the forwarding efficiency class (FEC) to next hop label forwarding entry (NHLFE) entry (i.e., an FTN entry) of the protected LSP is modified by replacing the NHLFE of the FTN entry with the NHLFE of the incoming label map (ILM) entry of the corresponding downstream label of the detour LSP (Block 703). In other words, the routing of the protected LSP is altered to send data traffic to the next LSR downstream in the detour LSP.

Then the downstream ILM entry for the protected LSP is modified for swap operations to match the label operation of the detour LSP (Block 705). Thus, the protected LSP is further modified to perform the same label operations on incoming packets as specified by the detour LSP, thereby preparing them for forwarding on the detour LSP.

The determination is then made as to whether the protected LSP is uni-directional or bi-directional (Block 707). If the protected LSP is a uni-directional protected LSP, then the data traffic is directed on to the detour LSP until another fast alert packet providing a 'traffic inactive' or 'traffic switch' message is received (Block 701). If a fast alert packet with a 'traffic inactive' or 'traffic switch is received, then the configuration of the label switch operations and the ILM entries for the protected LSP are reverted to their original state prior to the protection switch (Block 721).

However, if the protected LSP is not uni-directional, then a determination is made whether a pop or swap operation is indicated in the ILM table for incoming data traffic (Block 709). If a pop operation is indicated, then no further actions are required and the next fast alert packet with a traffic inactive message is awaited (Block 719). However, if a swap operation is indicated for the incoming data traffic, then the determination is made whether a bottom of stack bit is set for a received fast alert packet (Block 711). If a stack bottom bit is set, then no further modification is needed to the ILM table of the protected LSP and the reception of a fast alert packet indicating a traffic inactive message is awaited (Block 719).

If a bottom stack bit is not set for the fast alert packet, then a determination is made whether an inner label is an alert label (Block 715). If the inner label is an alert label, then the LSR is configured to use the original label operation specified for the detour LSP for the outer label (Block 713). However, if the inner label is not an alert label then the LSR continues to perform swap operations on the outer label correspond to the NHLFE of the ILM entry of the upstream ILM entry of the protected LSP (Block 717). In either case, after the preceding steps are completed, then the process waits for the reception of a fast alert packet indicating a 'traffic inactive' or 'traffic switch' message (Block 719).

Thus, a method, system and apparatus for back-up LSP optimization has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method performed on a network element employing Multi-Protocol Label Switching (MPLS) to optimize bandwidth in a ring topology network including a back-up Label Switch Path (LSP) for a protected LSP by re-routing traffic onto an optimized back-up LSP to avoid shared links between the protected LSP and back-up LSP, the method comprising the steps of:
   receiving a first labeled packet from another label switch router (LSR) in the protected LSP, the first labeled packet indicating a protection switch of data from the protected LSP to the back-up LSP;
   determining by the network element that the network element is a shared LSR in the ring topology network that is furthest upstream on a segment of the protected LSP that overlaps the back-up LSP, wherein the shared LSR is an LSR that is shared between the protected LSP and the back-up LSP;
   rerouting traffic at the network element for the protected LSP onto the optimized back-up LSP in response to the determining that the network element is the furthest upstream on the segment;
   receiving a second labeled packet indicating a protection switch of data from the optimized back-up LSP to the protected LSP; and
   restoring routing of the traffic onto the protected LSP in response to receiving the second labeled packet.

2. The method of claim 1, wherein rerouting traffic for the protected LSP onto the optimized back-up LSP comprises the steps of:
   modifying a forwarding efficiency class (FEC) to next hop label forwarding entry (NHLFE) (FTN) entry of the protected LSP by replacing an NHLFE in the FIN entry with an NHLFE of an incoming label map (ILM) entry of a corresponding downstream ILM entry of the back-up LSP, wherein the back-up LSP is a detour LSP; and
   modifying a downstream ILM entry for a protected LSP for a swap operation to match a label operation of the downstream ILM entry of the detour LSP.

3. The method of claim 1, wherein rerouting traffic for the protected LSP onto the optimized back-up LSP comprises the steps of:
   routing data traffic onto the optimized back-up LSP, wherein the optimized back-up LSP has been determined by a comparison of the protected LSP and a back-up LSP to locate an upstream point of local repair.

4. The method of claim 1, further comprising the steps of:
   determining the first labeled packet is a fast alert packet including a traffic active message or a protection switch indicator.

5. The method of claim 3, further comprising the steps of:
   determining the optimized back-up LSP using a record route object (RRO) of the protected LSP and back-up LSP and a traffic engineering database.

6. The method of claim 2, wherein rerouting traffic for the protected LSP onto the optimized back-up LSP comprises the steps of:
   configuring the network element to swap a label of a packet from the data traffic with an incoming label entry for an upstream direction of the protected LSP, in response to determining that the label of the packet has a bottom of stack bit set.

7. A system for employing Multi-Protocol Label Switching (MPLS) to optimize bandwidth in a ring topology network including a back-up Label Switch Path (LSP) for a protected LSP by re-routing traffic onto an optimized back-up LSP to avoid shared links between the protected LSP and back-up LSP, the system comprising:
   a first label switch router (LSR) in the protected LSP adapted to identify a failure in a link of the ring topology network and to initiate a first protection switch by sending a first alert packet on the protected LSP and back-up LSP; and
   a second LSR in communication with the first LSR over the ring topology network, the second LSR adapted to receive the first alert packet, determine that the second LSR is a shared LSR in the ring topology network that is furthest upstream on a segment of the protected LSP that overlaps the back-up LSP, wherein the shared LSR is an LSR that is shared between the protected LSP and the back-up LSP, reroute traffic at the second LSR for the protected LSP onto the optimized back-up LSP in response to the determination that the second LSR is the furthest upstream on the segment, receive a second alert packet that indicates a second protection switch of data from the optimized back-up LSP to the protected LSP, and restore routing of the traffic onto the protected LSP in response to receiving the second alert packet.

8. The system of claim 7, wherein the second LSR is adapted to modify a forwarding efficiency class (FEC) to next hop label forwarding entry (NHLFE) (FTN) entry of the protected LSP by replacing an NHLFE in the FTN entry with an NHLFE of an incoming label map (ILM) entry of a corresponding downstream ILM entry of the back-up LSP, wherein the back-up LSP is a detour LSP, and modify a downstream ILM entry for a protected LSP for a swap operation to match a label operation of the downstream ILM entry of the detour LSP.

9. The system of claim 7, wherein the second LSR is adapted to route traffic onto the optimized back-up LSP, wherein the optimized back-up LSP has been determined by a comparison of the protected LSP and a back-up LSP to locate an upstream point of local repair.

10. The system of claim 7, wherein the second LSR is adapted to determine the first alert packet is a fast alert packet and includes a traffic active message or a protection switch indicator.

11. The system of claim 7, wherein the second LSR is adapted to determine the optimized back-up LSP using a record route object (RRO) of the protected LSP and back-up LSP and a traffic engineering database.

12. The system of claim 9, wherein the second LSR is adapted to configure the network element to swap a label of a packet from the data traffic with an incoming label entry for an upstream direction of the protected LSP, in response to determining that the label of the packet has a bottom of stack bit set.

13. A network element for employing Multi-Protocol Label Switching (MPLS) to optimize bandwidth in a ring topology network including a back-up Label Switch Path (LSP) for a protected LSP by re-routing traffic onto an optimized back-up LSP to avoid shared links between the protected LSP and back-up LSP, the network element comprising:
an alert processing module adapted to receive a first labeled packet indicating a first protection switch of data from the protected LSP to the back-up LSP and receive a second labeled packet indicating a second protection switch of data from the back-up LSP to the protected LSP;
an optimized reroute module coupled to the alert processing module, the optimized reroute module adapted to determine that the network element is a shared label switch router (LSR) in the ring topology network that is furthest upstream on a segment of the protected LSP that overlaps the back-up LSP, wherein the shared LSR is an LSR that is shared between the protected LSP and the back-up LSP, reroute traffic at the network element for the protected LSP onto the optimized back-up LSP in response to the determination that the network element is the furthest upstream on the segment, and restore routing of the traffic onto the protected LSP in response to receiving the second labeled packet.

14. The network element of claim 13, wherein optimized reroute module is adapted to modify a forwarding efficiency class (FEC) to next hop label forwarding entry (NHLFE) (FTN) entry of the protected LSP by replacing an NHLFE in the FTN entry with an NHLFE of an incoming label map (ILM) entry of a corresponding downstream ILM entry of the back-up LSP, wherein the back-up LSP is a detour LSP, and modify a downstream ILM entry for a protected LSP for a swap operation to match a label operation of the downstream ILM entry of the detour LSP.

15. The network element of claim 13, wherein the optimized reroute module is adapted to route traffic onto the optimized back-up LSP, wherein the optimized back-up LSP has been determined by a comparison of the protected LSP and a back-up LSP to locate an upstream point of local repair.

16. The network element of claim 13, wherein the alert processing module is adapted to determine the first labeled packet is a fast alert packet including a traffic active message or a protection switch indicator.

17. The network element of claim 13, wherein the optimize reroute module is adapted to determine the optimized back-up LSP using a record route object (RRO) of the protected LSP and back-up LSP and a traffic engineering database.

18. The network element of claim 13, wherein the optimized reroute module is adapted to configure the network element to swap a label of a packet from the data traffic with an incoming label entry for an upstream direction of the protected LSP, in response to determining that the label of the packet has a bottom of stack bit set.

* * * * *

UNITED STATES PATENT AND TRADEMARK OFFICE
CERTIFICATE OF CORRECTION

PATENT NO. : 8,467,289 B2
APPLICATION NO. : 12/710244
DATED : June 18, 2013
INVENTOR(S) : Kini et al.

Page 1 of 1

It is certified that error appears in the above-identified patent and that said Letters Patent is hereby corrected as shown below:

In the Specification:

In Column 2, Line 50, delete "a optimized" and insert -- an optimized --, therefor.

In Column 5, Line 13, delete "a optimized" and insert -- an optimized --, therefor.

In Column 6, Line 51, delete "utilized" and insert -- utilized. --, therefor.

In the Claims:

In Column 9, Line 61, in Claim 2, delete "FIN" and insert -- FTN --, therefor.

In Column 12, Line 6, in Claim 14, delete "wherein" and insert -- wherein the --, therefor.

Signed and Sealed this
Twenty-ninth Day of October, 2013

Teresa Stanek Rea
*Deputy Director of the United States Patent and Trademark Office*